United States Patent
Mukherjee et al.

(10) Patent No.: US 12,175,772 B2
(45) Date of Patent: Dec. 24, 2024

(54) METHOD AND SYSTEM FOR DATA OBJECT IDENTIFICATION IN VEHICLES

(71) Applicant: BlackBerry Limited, Waterloo (CA)

(72) Inventors: Biswaroop Mukherjee, Stittsville (CA); Geordon Thomas Ferguson, Mississauga (CA); Nick Ehli Cano, San Jose, CA (US); Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 175 days.

(21) Appl. No.: 17/725,233

(22) Filed: Apr. 20, 2022

(65) Prior Publication Data
US 2023/0343110 A1    Oct. 26, 2023

(51) Int. Cl.
*G06V 20/59*    (2022.01)
*G06V 10/20*    (2022.01)
*G06V 10/22*    (2022.01)

(52) U.S. Cl.
CPC ............ *G06V 20/59* (2022.01); *G06V 10/225* (2022.01); *G06V 10/255* (2022.01)

(58) Field of Classification Search
CPC ........ G06F 16/289; G06F 16/41; G06F 16/51; G06F 16/901; G06F 16/9535; G06V 20/59; G06V 10/255; G06V 10/225
See application file for complete search history.

(56) References Cited

U.S. PATENT DOCUMENTS

| | | | | |
|---|---|---|---|---|
| 6,005,958 | A | * | 12/1999 | Farmer .................... G06T 7/70 382/104 |
| 11,628,789 | B2 | * | 4/2023 | Manawadu ....... B60R 21/01552 701/45 |
| 2011/0285657 | A1 | | 11/2011 | Shimotani et al. |
| 2013/0097534 | A1 | | 4/2013 | Lewin et al. |
| 2017/0013386 | A1 | * | 1/2017 | Vautin ....................... H04S 7/30 |
| 2019/0299895 | A1 | * | 10/2019 | Herbert ............. B60R 21/01554 |
| 2019/0299897 | A1 | * | 10/2019 | Gramenos ............ B60N 2/4279 |
| 2020/0290567 | A1 | * | 9/2020 | Funyak ................. B60R 25/102 |
| 2023/0013133 | A1 | * | 1/2023 | Shaik ........................ G06T 7/70 |

FOREIGN PATENT DOCUMENTS

WO    WO-2020165908 A2 *    8/2020    ........ B60W 50/0098

OTHER PUBLICATIONS

European Patent Office Extended European Search Report (EESR) for Application No. 23151089.2-1218, dated Aug. 11, 2023.

\* cited by examiner

*Primary Examiner* — Dung Hong
(74) *Attorney, Agent, or Firm* — Moffat & Co

(57) ABSTRACT

A method at a computing device for finding an association between data objects in a structure, the method including selecting a coordinate location from a grid, the grid defining locations within the structure; finding whether a data object having a data object type is located at the coordinate location; when the data object is located at the coordinate location, associating the data object with other data objects at the coordinate location; and when the data object is not located at the coordinate location: determining through an explicit association that the data object at a second location services the first location; and associating the data object with the coordinate location.

19 Claims, 11 Drawing Sheets

METHOD AND SYSTEM FOR DATA OBJECT IDENTIFICATION IN VEHICLES

FIELD OF THE DISCLOSURE

The present disclosure relates to vehicle systems, and in particular relates to objects within such vehicle systems.

BACKGROUND

Modern vehicles have many components and sensors. Such components and sensors may be referred to as data objects, and be queried and combined to provide insights into the vehicle and the operation of the vehicle.

However, utilizing current tree like structures to define the data objects is rigid, and can provide data files that are large and difficult to create. Further such tree-like data structures grow exponentially based on associations between the data objects.

BRIEF DESCRIPTION OF THE DRAWINGS

The present disclosure will be better understood with reference to the drawings, in which.

DETAILED DESCRIPTION OF THE DRAWINGS

Figure 1:
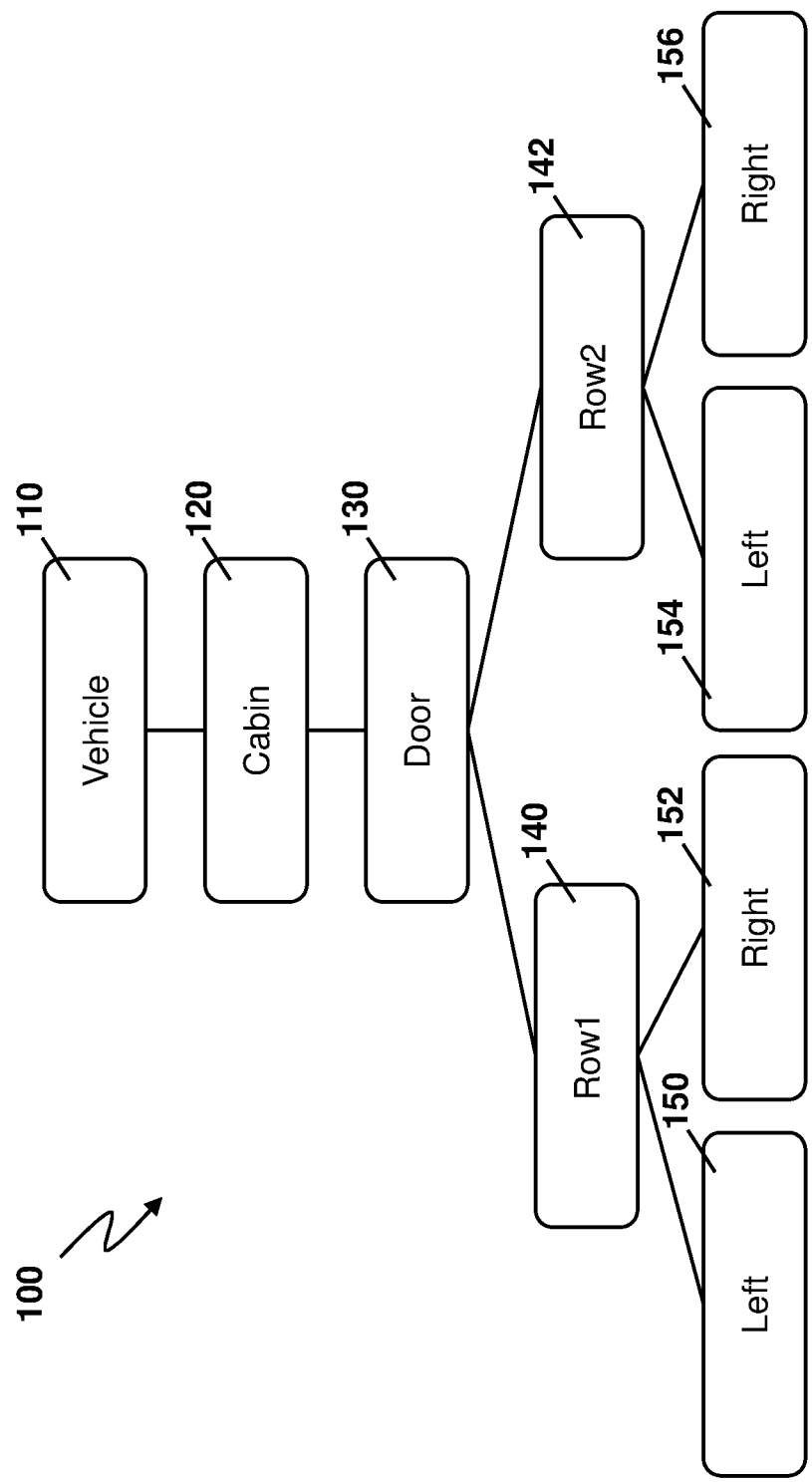
FIG. 1 is a block diagram showing a tree structure for classifying objects.

The present disclosure provides a method at a computing device for finding an association between data objects in a structure, the method comprising: selecting a coordinate location from a grid, the grid defining locations within the structure; finding whether a data object having a data object type is located at the coordinate location; when the data object is located at the coordinate location, associating the data object with other data objects at the coordinate location; and when the data object is not located at the coordinate location: determining through an explicit association that the data object at a second location services the first location; and associating the data object with the coordinate location.

The present disclosure further provides a computing device configured for finding an association between data objects in a structure, the computing device comprising: a processor; and a communications subsystem, wherein the computing device is configured to: select a coordinate location from a grid, the grid defining locations within the structure; find whether a data object having a data object type is located at the coordinate location; when the data object is located at the coordinate location, associate the data object with other data objects at the coordinate location; and when the data object is not located at the coordinate location: determine through an explicit association based on coordinates that the data object at a second location services the first location; and associate the data object with the coordinate location.

The present disclosure further provides a computer readable medium for storing instruction code, which, when executed by a processor of a computing device configured for finding an association between data objects in a structure causes the computing device to: select a coordinate location from a grid, the grid defining locations within the structure; find whether a data object having a data object type is located at the coordinate location; when the data object is located at the coordinate location, associate the data object with other data objects at the coordinate location; and when the data object is not located at the coordinate location: determine through an explicit association that the data object at a second location services the first location; and associate the data object with the coordinate location.

In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and synthetic sensor are used interchangeably herein.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer created sensor data based on an interpretation of a set of basic sensor data generated by objects representing vehicle components (data objects). Insights can be as straight forward as data aggregation or correlation or as complex as artificial intelligence and machine learning. For example, a temperature sensor providing high and low watermarks for notification may be considered an "insight". For location services, geofencing is an insight. For cameras, occupant recognition may be an insight. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors that derive intelligent insights on vehicle data using common cloud development technologies and paradigms. Such environment may provide consistent access to vehicle data such that Synthetic Sensors can be written and deployed to a broad vehicle base without bespoke customization.

However, in order for such vehicle data to be easily accessed, the data objects within the vehicle need to be identified, located, and associations between various data objects within the vehicle need to be easily identified.

This may be complicated by different vehicle manufacturers using different naming conventions and relationship conventions. In order to overcome this, the Vehicle Signal Specification (VSS) is currently being used. VSS defines itself as a way to create a common understanding of vehicle signals in order to reach a common language independent of the protocol or serialization used.

The VSS naming convention is, for example, described in Table 1 below.

TABLE 1

Example VSS naming conventions

Body.Mirror.Left.Heated
Body.Mirror.Right.Heated
Cabin.Door.Row1.left.open
Cabin.Door.Row2.left.open
Cabin.Seat.Row1.left.heated
Cabin.Seat.Row1.right.heated
Cabin.Seat.Row2.left.heated
Cabin.Seat.Row2.middle.heated
Cabin.Seat.Row2.right.heated As seen from Table 1 above, a dot notated name path is utilized in the VSS standards to identify the component and the last component in the notated name path is a signal or attribute.

Utilizing the dot notated name path, a tree structure can therefore be built for the various data objects within the vehicle. For example, reference is now made to FIG. 1.

In the embodiment of FIG. 1, an object tree 100 has the vehicle 110 as the root. Below this root, an example in the tree could be a cabin 120.

Cabin 120 may have doors, shown as door 130.

The doors may be defined based on the row in the vehicle, namely row1 140 and row2 142.

Further, the door in each row may be specified based on the position in the vehicle. Specifically, the door in row1 140 could be a left door 150 or a right door 152. Similarly, a door in row2 142 could be a left door 154 or a right door 156.

The localization of instances of components in a tree structure is very rigid and has various shortcomings. Specifically, vehicles have components that have multiple instances. This causes the VSS tree to grow extremely large. The VSS specification is also not well suited for non-standard vehicles, such as motorcycles with side cars, buses, double decker buses, center drive vehicles, auto rickshaws, among others. As used herein, components are specific elements of a vehicle, and sets of sensors from these components may be referred to as data objects.

Further, some instances of these components are associated with other components. For example, there may be several seats in vehicle, and also several heating, ventilation and air conditioning (HVAC) units in the vehicle. The seats and HVAC units may be related to each other, but not necessarily be in the same position. For example, a middle seat in a second row of a vehicle may be serviced by HVAC units that are under the left and right front seats.

Modern vehicle systems need a way to represent components and associate them with other components, such that the users of vehicle services application program interfaces (APIs) can query the components and their associations easily, and therefore derive data from them.

Utilizing a tree structure such as that described with VSS, the listing of the relations between all pairs becomes exponential based on the number of components. Since modern vehicles have many components, the listing of such relations becomes cost prohibitive.

Therefore, in accordance with the embodiments of the present disclosure, a three dimensional grid structure to define the position of the component is provided. Such grid assigns a position to all components.

In particular, a three dimensional grid system would support any kind of vehicle, from a sedan to a double Decker bus, as well as motorcycles and oddly shaped vehicles such as the McLaren™ 3 seater.

As a consequence, a default relation also is created. Components in the same grid location may be automatically associated by default. For example, in a cabin API, given a seat, an API user can find the HVAC, screen, seat belt, window, among other objects that services the seat simply by the fact that they are located in the same grid position.

The grid system provides three separate coordinates to locate components in a vehicle. A single grid system for the entire vehicle or separate grid systems for various parts of the vehicles such as the cabin could be implemented. The three separate coordinates could be defined as a triplet such as an (x,y,z) triplet. However, in other embodiments, other ordering or coordinate systems could be utilized.

In one embodiment, the first coordinate could correspond with the concept of rows, the second coordinate could correspond with the concept of columns and the third coordinate could correspond with the concept of levels. In other embodiments, the coordinates could represent the rows, columns and levels in different orders.

Further, the rows could be in ascending order from front to back, the columns could be in ascending order from left to right, and the levels could be ascending from lowest to highest in some cases. However, this is merely provided for illustration and the ordering could be done in different ways.

Further, when defining a coordinate system, an index origin may be designated. In some cases, the index may be a zero or a one, for example. In some cases, a decision needs to be made on whether to support negative indices.

These and other elements are described below.

Figure 2:
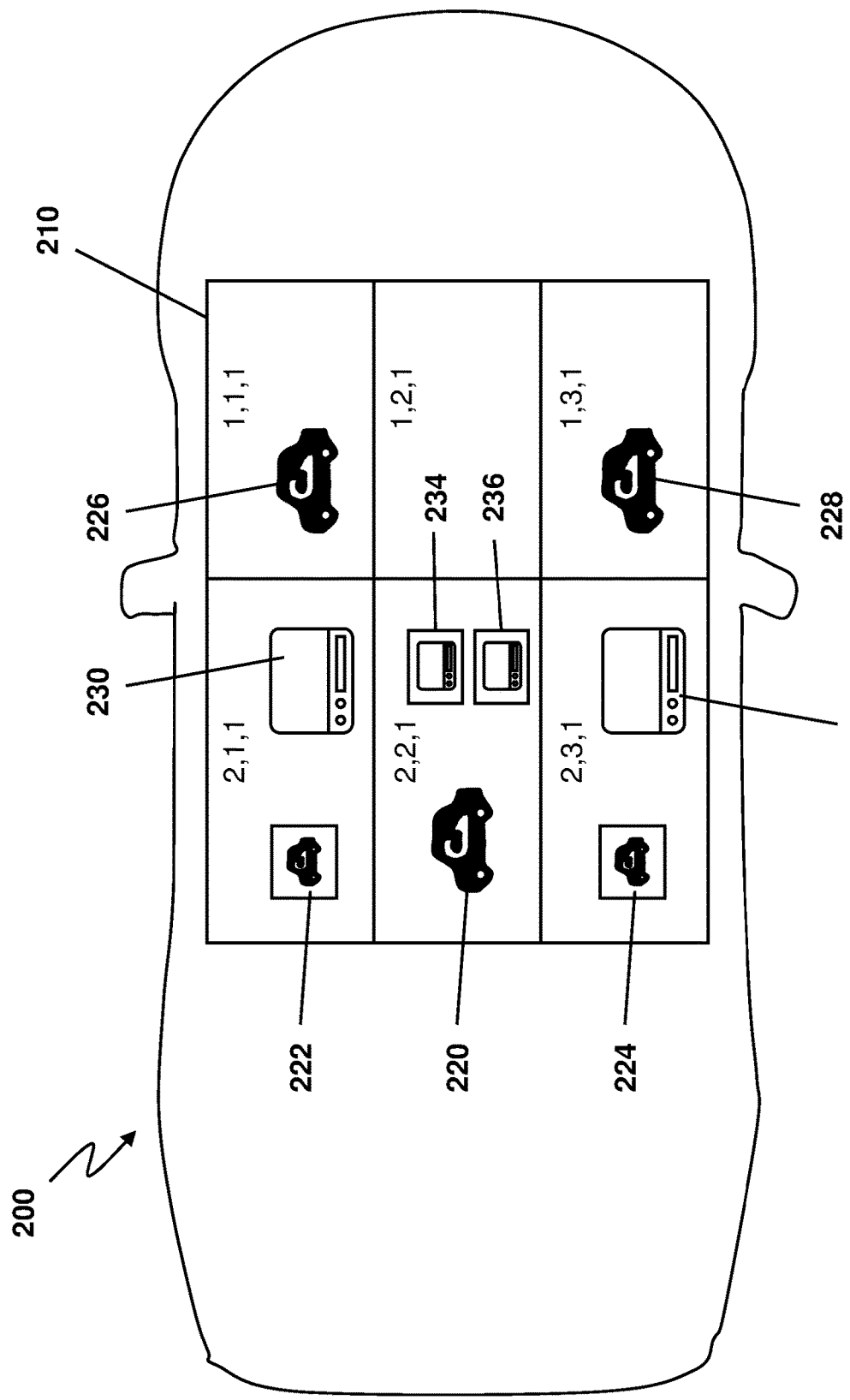
FIG. 2 is a block diagram showing an example grid structure for locating objects within a structure.

Reference is now made to FIG. 2. In FIG. 2, a vehicle 200 has a grid system 210 for identification of the location of data objects within the vehicle. As can be seen in the embodiment of FIG. 2, the grid 210 includes two rows and three columns. Further, a single level exists within grid 210.

The grid is organized in the example of FIG. 2 to be numbered from the front of the vehicle to the back of the vehicle. Therefore, the (x,y,z) triplet identifying each location within the grid utilizes the "x" value to represent the row, "y" value to represent the column, and the "z" value to represent the level. The "x" value counts from the front of the vehicle to the back of the vehicle, starting with an index of "1". This allows for an index of "0" to indicate "all rows", for example.

Similarly, columns are counted from left to right starting with an index value of "1".

Further, the levels in a multi level vehicle would start at level 1 for the level closest to the ground, level 2 for the next level, and so on.

Various components or data objects may be defined within grid 210. For example, the embodiment of FIG. 2 shows an HVAC system 220 located in the rear middle seat, at grid position (2,2,1). As explained below, HVAC system 220 may automatically be associated with the rear middle seat based on the fact that it is colocated with the rear middle seat in the grid system. However, HVAC system 220 may further service the rear left seat at grid position (2,1,1), and this is shown with an association 222, HVAC system 220 may further service the rear right seat at grid position (2,3,1), and this is shown with association 224.

Similarly, an HVAC system 226 may service the seat at grid location (1,1,1) based on the fact that it is collocated with such seat. HVAC system 228 may service the seat at grid location (1,3,1) based on the fact that it is collocated with such seat.

A display system 230 may be found at grid location (2,1,1). In this regard, the display system 230 may service the seat at grid location (2,1,1).

A display system 232 may be found at grid location (2,3,1). In this regard, the display system 232 may service the seat at grid location (2,3,1).

The rear centre seat at grid location (2,2,1) does not have a display system at its location. However, the passenger in the rear centre seat could make use of either display system 230 or display system 232. In this regard, an association 234 is provided for display system 230 at grid location (2,2,1) and an association 236 is provided for display system 232 at grid location (2,2,1).

The example of FIG. 2 is merely a simplified example of a grid system showing various components. Each component or data object may either be collocated with other data components, thereby creating a first implicit association between data objects in some cases, or may be associated with other grid locations using a second, explicit association. The embodiment of FIG. 2 shows only a cabin portion of a vehicle and the grid applied thereto. In other cases, the grid could be applied to the entire vehicle, or the vehicle could have multiple grid systems for the various spaces within the vehicle. Other options are possible.

GRID GRANULARITY

While the embodiment of FIG. 2 defines the grid based on seats and rows in a cabin, in some cases, an Original Equipment Manufacturer (OEM) could decide to define a more granular grid for their vehicle. For example, the chosen granularity may be made by balancing the level of precision or granularity it provides against the loss of simplicity provided by collocation. Further, in some cases, an implicit "servicing" relationship created by collocation may not be what is wanted, necessitating the use of a more granular grid. That is, selecting a low granularity grid might create implicit associations that are not warranted in some cases, and thus a more granular grid may be chosen.

For example, a window may be clearly associated with the seat. However, position wise, other components may not be as clearly defined with regard to the seat.

Figure 3:
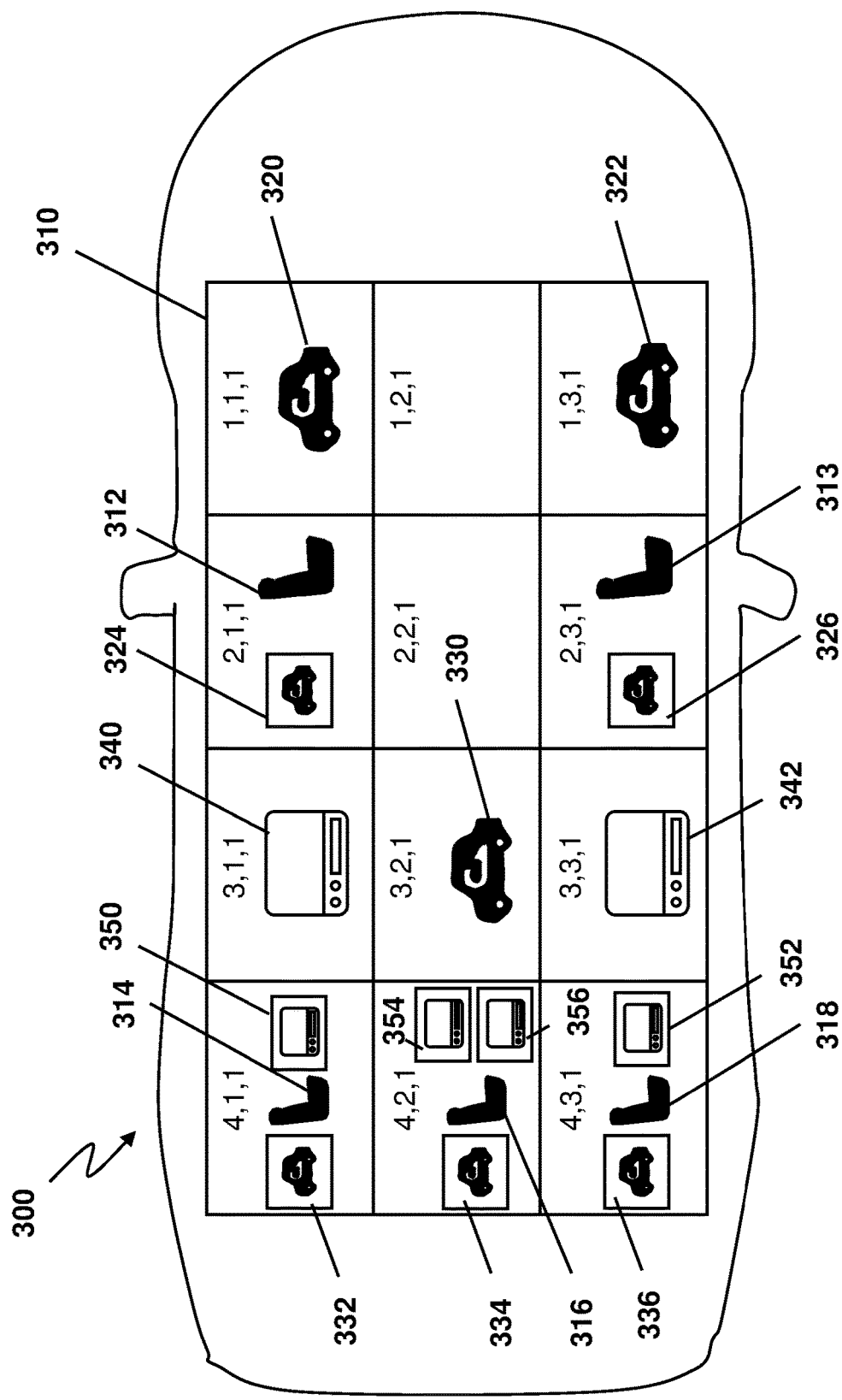
FIG. 3 is a block diagram block diagram showing another example grid structure for locating objects within a structure.

Reference is now made to FIG. 3, which shows a more granular grid 310 for a vehicle 300 than the grid of FIG. 2. Specifically, the example of FIG. 3 shows a grid with four rows, three columns and one level.

In this case, the vehicle manufacturer could assign seat positions in the second and fourth rows. Specifically, front row seats 312 and 313 could be assigned to positions (2,1,1) and (2,3,1) respectively. Rear seats 314, 316 and 318 could be assigned to positions (4,1,1), (4,2,1), and (4,3,1) respectively.

Row one could indicate the dashboard position and row three could be associated with the back of the seats or back of the front central console. In this regard, HVAC systems 320 and 322 could be positioned at (1,1,1) and (1,3,1). Such HVAC systems are for the seats at (2,1,1) and (2,3,1) respectively, and this is shown with HVAC associations 324 and 326. As will be appreciated by those in the art, the creation of the more granular grid of FIG. 3 loses the implicit associations between the seats and HVAC units when compared with the embodiment of FIG. 2. However, more specificity is gained.

Similarly, an HVAC system 330 that is centered in row 3 at position (3,2,1) could be used to serve the entire back row. This is shown with HVAC association 332 at position (4,1,1), HVAC association 334 at position (4,2,1), and HVAC association 336 at position (4,3,1).

A vehicle may, in some cases, include entertainment screens on the back of the front seats for the benefit of the rear passengers. This is shown in the embodiment of FIG. 3 as entertainment screen 340 at position (3,1,1) and entertainment screen 342 at position (3,3,1).

Screen 340 may be used by the occupant of seat (4,1,1), as shown with screen association 350. Screen 342 may be used by the occupant of seat (4,3,1), as shown with screen association 352. The occupant of the seat positioned at (4,2,1) may use either screen 340 or 342, and therefore position (4,2,1) is shown to have screen associations 354 and 356.

Therefore, the grid system as illustrated in FIGS. 2 and 3 could be expanded to the granularity that is needed by the vehicle manufacturer or the entity defining the positions of data objects within the vehicle/space/structure.

ASSOCIATIONS/RELATIONSHIPS/SERVICING

In accordance with embodiments of the present disclosure, data objects at a particular location may be intrinsically associated with each other by being in the same grid location. Specifically, a seat belt sensor located in the same grid location as a seat would be intrinsically associated with the seat based on its location.

However, in some cases the intrinsic relationship based on the grid position may not be wanted, and therefore the intrinsic relationship is optional in some cases.

Further, as described with regards to FIGS. 2 and 3, in some embodiments there is a need to create associations or relationships between components that cannot easily be expressed based on location. While a window can easily be associated with a specific seat simply on the basis of both having the same coordinates, the association or relationship is not always positional. Referring to FIGS. 2 and 3, the HVAC system for the rear seat may be positioned in a middle location but be oriented towards a specific seat. A query within a computing system such as "Which HVAC is providing service to the seat at (2,1,1)" cannot be answered by checking if there is an HVAC at (2,1,1) when it is located centrally at (2,2,1).

Further, in some embodiments the "service" tags may not be static, but may rather be dynamic based on conditions. For example, in the embodiment of FIG. 3, display 340 may be tilted such that it can be seen at positions (4,1,1) and (4 2,1). Display 342 may be oriented such that it is only viewable at location (4,3,1). The associations at position (4,2,1) may be dynamic and, for example, based on a tilt sensor within displays 340 and 342.

In this regard, a different approach could be used, and the OEM may have the ability to define specific associations in addition to ones based on colocation. Referring to FIGS. 2 and 3, the associations are shown, for example, as associations 222 and 224 for HVAC system 220 in FIG. 2 and associations 332, 334, and 336 for HVAC system 330 in the embodiment of FIG. 3. This may be done using "service" tags in one embodiment, as described below.

REPRESENTATION

Utilizing the grid approaches described above with regard to FIGS. 2 and 3, a mechanism is provided that allows a vehicle manufacturer or other service provider to define the cabin content and coordinate assignment. More generally, a mechanism is provided that allows data objects to be assigned locations within a grid for a service area such as a vehicle.

The encoding of such coordinates could be done in various ways. The examples below provide JavaScript Object Notation (JSON) implementations. However, such JSON implementations are merely provided for illustration and those skilled in the art would appreciate that other notations could equally be used.

In the notations below, coordinates are a triplet expressed as a JSON array of three positive integers.

Further, in the notations below, the grid is being established for a cabin of the vehicle. Again, this is for illustration purposes only and the grid could be used with any number of structures. In the examples below, a "cabin" tag is used to represent a root of a cabin structure. If the grid is used for other purposes, the root could be something such as "chasis", "engine_compartment", among others for vehicle grids, "home" for home automation applications, among other examples.

A "coordinate" tag can be used anywhere to define specific coordinates. Its value is an array of three integers corresponding, respectively, to row, column and level. However, in some embodiments, the coordinate may only be two dimensional.

Typically, such coordinates tag would be used not directly under the "cabin" tag, but instead by other text to specify where such data object is located.

For example, reference is now made to Table 2 below:

TABLE 2

Example of a coordinate tag

"some-tag" : {
  "coordinate" : [2,2,2]
}

As seen in Table 2 above, the tag for a data object is referred to as "some-tag", and refers to a data object that is either predefined in the system or that can be created by various end users. In this case, the coordinate of the data object is specified as a triplet indicating that the object is located in row 2, column 2, and level 2.

In addition to providing a coordinate, a data object may have information about the locations that the digital object services. For example, referring to Table 3 below, the data object may be specified to be in a particular coordinate location and to service various locations.

TABLE 3

Example of a services tag

"some-tag" : {
  "coordinate" : [2,2,2]
  "services" : [2,1,2], [2,2,2], [2,3,2]
}

As seen from Table 3 above, the data object is in location (2,2,2), meaning that it is in the second row, second column and second level. The data object services locations (2,1,2), (2,2,2) and (2,3,2).

In the example of Table 3, the object's own location is enumerated in the locations that it services. However, in some embodiments the own location can be omitted as the data object likely services its own location. However, in other cases, there are situations where a component or data object may not service its own grid location and therefore in some embodiments the locations that the data object services can explicitly include the data object's own location.

In the example of Table 3, the serviced locations are provided as an array of triplets. However, other notations are possible.

In some cases, it may be beneficial to specify the size of the grid for the platform, vehicle or service area. This may be done, for example, using a "dimensions" tag, as provided for example in Table 4 below.

TABLE 4

Example of a dimensions tag

"cabin" : {
  "dimensions" : [2,3,1]
}

Thus, from Table 4, the "dimensions" tag can be used to define the size and granularity of the grid for the cabin. Such dimensions tag can then be used by a program to find the maximum values, for example, for a row or column. This could be used to find the rear row of seats, the front passenger seat, among other options. For example, in a left drive vehicle, the driver may be a position (1,1,1). The dimensions may be used to find that there are 3 columns, and therefore the passenger would be at (1,3,1), where column 3 is the maximum value for the columns.

Further, in some embodiments when utilizing the grid for vehicles, it may be beneficial to specify the location of the driver's seat. This may be done, for example, utilizing a "drivers" tag. In a standard vehicle, the identification of the driver's seat may be done in accordance with Table 5 below.

TABLE 5

Example of a drivers tag with a single driver

"cabin" : {
  "drivers" : [
    {
      "coordinate" : [1,1,1]
    }
  ]
}

From Table 5, assuming the grid is specified in columns from left to right, the driver is indicated to be on the left side of the vehicle. For right hand drive vehicles, assuming the grid is specified in columns from left to right, the driver location would be specified as the maximum column value in some embodiments (assuming that an additional column for the area beside the seat is not added).

However, utilizing the grid coordinate system of the present disclosure, the specification is robust enough to capture outlying situations. For example, in the case of a street sweeper which may have two driving positions, this may be specified in accordance with Table 6 below.

TABLE 6

Example of a drivers tag with multiple driver locations

```
"cabin" : {
    "drivers" : [
        {
            "coordinate" : [1,1,1]
        },
        {
            "coordinate" : [1,3,1]
        }
    ]
}
```

In Table 6, the drivers tag is specified with two locations, namely the front left and the front right seat locations.

Similarly, the seats can be specified using a "seats" tag to define the coordinates for each seat. An example is provided in Table 7 below.

TABLE 7

Example of a seats tag

```
"cabin" : {
    "seats" : [
        {
            "coordinate" : [1,1,1]
        },
        {
            "coordinate" : [1,3,1]
        },
        {
            "coordinate" : [2,1,1]
        },
        {
            "coordinate" : [2,2,1]
        },
        {
            "coordinate" : [2,3,1]
        }
    ]
}
```

As seen in Table 7, various seats are defined in different locations.

Similarly, the doors on the vehicle can be specified utilizing a "doors" tag as provided in Table 8 below.

TABLE 8

Example of a doors tag

```
"cabin" : {
    "doors" : [
        {
            "coordinate" : [1,1,1]
        },
        {
            "coordinate" : [1,3,1]
        },
        {
            "coordinate" : [2,1,1]
        },
        {
            "coordinate" : [2,3,1]
        }
    ]
}
```

Table 8 shows the example of a four door vehicle. In a two door vehicle the coordinates may be associated with the front seats. On a bus the door may be located near the front and in the centre of the vehicle along one side, depending on whether the bus is a right hand or left hand drive bus, for example. Other options are possible.

Similarly, the windows may be specified using a "windows" tag. An example of such windows tag is shown with Table 9 below.

TABLE 9

Example of a windows tag

```
"cabin" : {
    "windows" : [
        {
            "coordinate" : [1,1,1]
        },
        {
            "coordinate" : [1,3,1]
        },
        {
            "coordinate" : [2,1,1]
        },
        {
            "coordinate" : [2,3,1]
        }
    ]
}
```

The windows in Table 9 may be those that can be raised or lowered in some embodiments. In this case, other windows within the vehicle may not be specified. This could be used, for example, to determine by a synthetic sensor whether the window is rolled up or rolled down.

In some embodiments it may be more efficient programmatically to label at least a subset of the various digital objects within the vehicle. For this reason, an ID tag could be used. In some embodiments the ID tag could be unique for a vehicle to allow the digital objects to be properly addressed. For example, in Table 10 below, the rear seats of the vehicle can be provided with an ID which could then be used by programs to find specific seats in the vehicle, find associations for a specific seat, or designate actions for specific seats in the vehicle.

TABLE 10

Example of an ID tag

```
"cabin" : {
    "seats" : [
        {
            "coordinate" : [1,1,1]
        },
        {
            "coordinate" : [1,3,1]
        },
        {
            "id" : "seat-RL"
            "coordinate" : [2,1,1]
        },
        {
            "id" : "seat-RM"
            "coordinate" : [2,2,1]
        },
        {
            "id" : "seat-RR"
            "coordinate" : [2,3,1]
        }
    ]
}
```

As seen in Table 10 above, the rear seats are identified as "seat-RL", meaning rear left seat, "seat-RM", meaning rear middle seat, and "seat-RR", meaning rear right seat.

The HVAC system could be specified using an "hvac" tag, as provided in Table 11 below.

TABLE 11

Example of an HVAC tag

```
"cabin" : {
    "hvac" : [
        {
            "coordinate" : [1,1,1]
        },
        {
            "coordinate" : [1,3,1]
        },
        {
            "coordinate" : [2,2,1]
        }
    ]
}
```

Similarly, the display screens could be specified using a "displays" tag, as provided in Table 12 below.

TABLE 12

Example of a displays tag

```
"cabin" : {
    "displays" : [
        {
            "id" : "display-RL"
            "coordinate" : [2,1,1]
        },
        {
            "id" : "display-RR"
            "coordinate" : [2,3,1]
        }
    ]
}
```

As seen in Table 12, the displays could be provided with coordinates as well as identifiers.

Further, in order to define associations, various options may be implemented. In one case, an association may be explicitly defined through an "associations" tag. For example, if the HVAC system for the rear has been defined with an ID of "hvac-RM" (rear-middle HVAC system) utilizing the tags defined in Tables 10 and 11 above, indicating a rear middle HVAC system, then the association tag may be defined as follows in Table 13.

TABLE 13

Example of an associations tag

```
"cabin" : {
    "associations" : [
        ["seat-RL", "hvac-RM"],
        ["seat-RM", "hvac-RM"],
        ["seat-RM", "display-RL"],
        ["seat-RM", "display-RR"],
        ["seat-RR", "hvac-RM"]
    ]
}
```

As seen in Table 13, each line specifies a single association. In this case, the association is specified based on the seat and an indication of the components or data objects that are servicing the seat. Thus, the rear middle seat, specified with ID tag "seat-RM", has an association with the rear middle HVAC system, the rear left display system, and the rear right display system.

However, other representations for associations are possible. For example, Table 14 and below shows a case in which multiple associations can be provided on a single line.

TABLE 14

Another example of an associations tag

```
"cabin" : {
    "associations" : [
        ["seat-RL", "hvac-RM"],
        ["seat-RM", "hvac-RM", "display-RL", "display-RR"],
        ["seat-RR", "hvac-RM"]
    ]
}
```

Therefore, in the example of Table 14, the first element in each line defines the data object that is being serviced, and the remaining data objects in the line specify the services being provided. Thus, the rear middle seat is shown to be serviced by the rear middle HVAC system, the rear left display system and the rear right display system.

In other cases, a more explicit differentiation between the data object being serviced and the data objects providing the services can be enumerated in the association. For example, in Table 15 below, the data objects providing the services can be provided in an array.

TABLE 15

Another example of an associations tag

```
"cabin" : {
    "associations" : [
        ["seat-RL", ["hvac-RM"]],
        ["seat-RM", ["hvac-RM", "display-RL", "display-RR"]],
        ["seat-RR", ["hvac-RM"]]
    ]
}
```

Thus, the arrays for the data objects providing services/functionality in Table 15 can be a single element array or can have multiple elements that are providing services/functionality to the various seats.

In still further embodiments, the notation for the associations can be in reverse order. Specifically, the data object providing the functionality or service can indicate to whom such service or functionality is being provided. This is illustrated for example in Table 16 below.

TABLE 16

Another example of an associations tag

```
"cabin" : {
    "associations" : [
        ["hvac-RM", ["seat-RL", "seat-RM", "seat-RR"]],
        ["display-RL", ["seat-RL", "seat-RM"]],
        ["display-RR", ["seat-RL", "seat-RR"]]
    ]
}
```

Thus, as seen in Table 16, the data object with the ID tag "hvac-RM" service is the data objects with ID tags "seat-RL", "seat-RM", and "seat-RR".

In further cases, the association may be defined as either unilateral or bilateral. A unilateral association would be in a single direction such as a HVAC service providing services to a seat. A bilateral association would be each data object providing services to the other data object, and may for example include sensors within the vehicle.

Further, in Tables 13 to 16 above, the associations were defined with regard to two data objects. For example, the associations indicate that an HVAC system services a particular seat. Rather than specify a particular data object, instead the association could be from a data object to a particular location. An example of a unilateral association specification to a location is shown with Table 17 below.

TABLE 17

Another example of an associations tag

```
"cabin" : {
    "associations" :
        "name" : "hvac-servicing",
        "unilateral" : [
            "hvac" : [ [2,2,1], [2,1,1] ],
            "hvac" : [ [2,2,1], [2,2,1] ],
            "hvac" : [ [2,2,1], [2,3,1] ],
        ]
    ]
}
```

Thus, from Table 17, the HVAC system located at (2,2,1) services locations (2,1,1), (2,2,1), and (2,3,1).

While Table 17 enumerates the associations as a single association on each line, in some cases the associations could be grouped. This is, for example, shown with Table 18.

TABLE 18

Another example of an associations tag

```
"cabin" : {
    "associations" :
        "name" : "hvac-servicing",
        "unilateral" : [
            "hvac" : [ [2,2,1], [2,1,1], [2,2,1], [2,3,1] ],
        ]
    ]
}
```

In the example of Table 18, the first element after the HVAC tag could indicate the element providing the functionality or service and the remaining elements could indicate the locations that the service is being provided to.

Further, in some embodiments, the JSON files defining the data objects within the platform could include various information together. For example, the coordinates and the services could be specified together as shown in Table 19.

TABLE 19

Example of an hvac and display tags integrating services

```
"cabin" : {
    "hvac" : [
        {
            "coordinate" : [1,1,1]
        },
        {
            "coordinate" : [1,3,1]
        },
        {
            "coordinate" : [2,2,1],
            "services" : [[2,1,1], [2,2,1], 2,3,1]]
        }
    ],
    "displays" : [
        {
            "coordinate" : [2,1,1]
            "services" : [[2,1,1], [2,2,1]]
        },
        {
            "coordinate" : [2,3,1]
            "services" : [[2,2,1], [2,3,1]]
        }
    ]
}
```

Thus, in Table 19, both the coordinates for the location of the data object and the locations that such data object services are specified together. In the example of Table 19, components without a "services" tag are assumed to service their own location only.

Therefore, Tables 2 to 19 provide examples of various notations that could be utilized with the grid system of FIGS. 2 and 3 to provide a robust system for locating and utilizing data objects within a system or platform. The notations provided in Tables 2 to 19 are merely provided for illustration and are not limiting. Those skilled in the art will realize that other notations could equally be used, and more or fewer tag or different tags could be used in a practical system.

SPANS

Using the HVAC example of FIG. 2, although the rear seat HVAC is located in the middle position, it's "area of effect" is clearly the full rear seat. Thus, in certain embodiments, it may be valuable to consider an area of effect independently of the position. In this case, the assignment of the HVAC system to the grid would be done based on the area of effect instead of the actual position in the cabin. In this case, the concept of a span may be supported.

In this case, a vehicle manufacturer may wish to place HVAC stations into the grid system at locations (1,1,1), (1,3,1) and (2,1-3,1) in the embodiment of FIG. 2.

The term (2,1-3,1) indicates that in row 2, level 1, the HVAC system applies to all of columns 1 to 3.

Thus, in one case, in addition to or instead of providing associations, spans may be provided to indicate the locations that the HVAC station services.

ASSIGNMENT OF VALUES

The grid provided above with regard to FIGS. 2 and 3 and Tables 2-19 could be created by anyone responsible for a particular structure or space. For example, in a vehicle setting, an Original Equipment Manufacturer could be responsible for defining the grid and populating it with the data objects representing the various data objects for the vehicle. In other cases the provider of the synthetic sensors could create the vehicle definition in the grid structure. Other parties could also be involved.

In some cases, the grid could be added to by third parties after it has been created. For example, in a vehicle scenario, aftermarket sales of components may lead to the grid for a particular vehicle being updated. Other options are possible.

Figure 4:
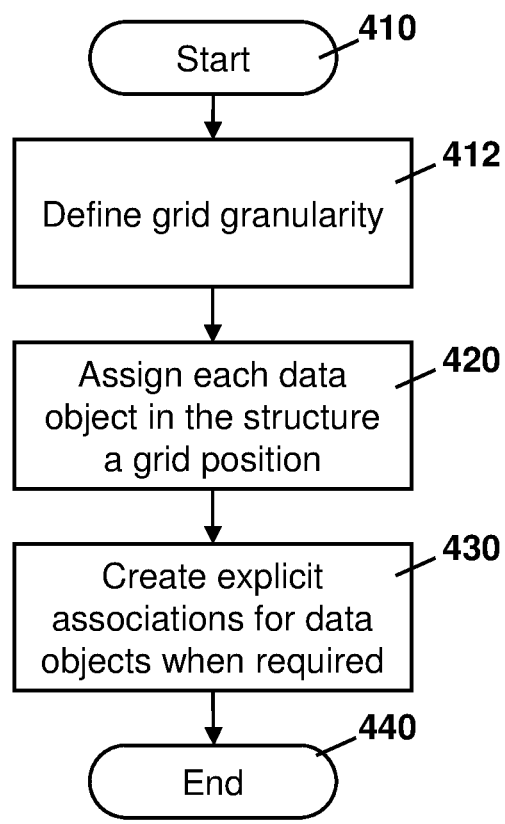
FIG. 4 is a process diagram for assigning data objects to the grid structure and defining associations for the data objects.

One simplified example of creating a vehicle definition in a grid structure is provided in FIG. 4. The process of FIG. 4 starts at block 410 and proceeds to block 412 in which the entity creating the vehicle definition may define a grid granularity for such vehicle. For example, the entity may specify that the grid shown with regard to FIG. 2 is sufficient in some cases. In other cases, the grid specified with regard to FIG. 3 may be used. In other cases, other grids may also be used.

From block 412, the proceeds to block 420 in which each data object that is within the structure may be assigned a grid position. The syntax or notation for assigning such grid position could for example use the examples in Tables 2-19 above.

Further, various data objects may be associated with, or service, other areas, and such associations or service areas could be defined at block 430. Block 430 shows the explicit creation of an association for data objects. The association may be between two particular data objects, between a data object and a specific location, for a data object and a span of locations, among other options.

From block 430, this is proceeds to block 440 and ends

USAGE

Various examples are provided below to indicate how the vehicle definition using the grid system of the present disclosure could be used in practice.

Is There a Driver in the Driver's Seat?

In one example, a system may need to know whether the driver's seat is occupied. The system would care about whether any of the driver's seats are occupied in the case that multiple driver seats could exist. For example, in a street sweeper case, an indication of whether driver is present should check whether the right hand or left hand drivers' seats are occupied.

Therefore, utilizing the grid system of the present disclosure and the example of Table 6, an inquiry could be made to find all the driver seats and then to do a systematic check to find whether any of them are occupied.

Figure 5:
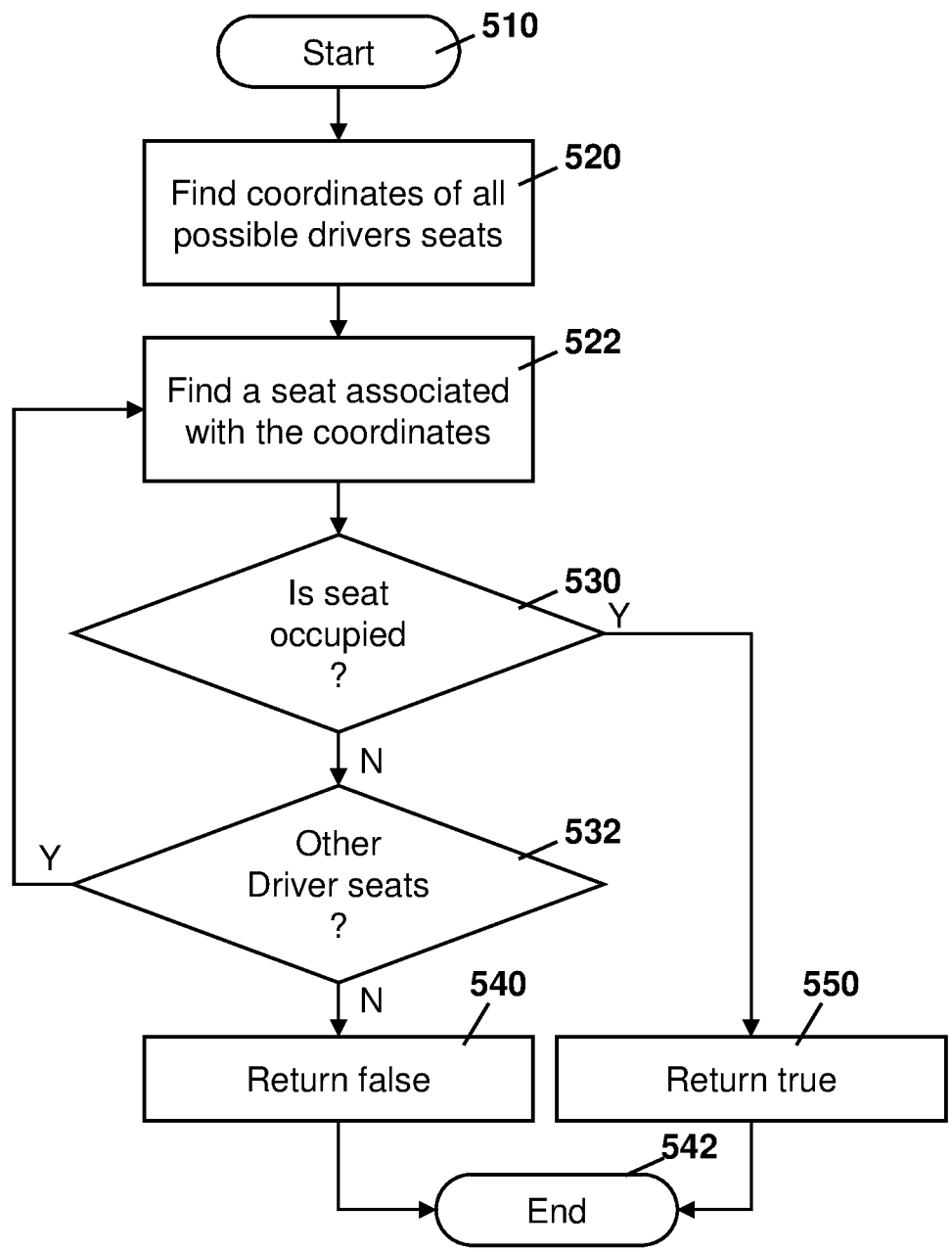
FIG. 5 is a process diagram for finding whether a driver's seat is occupied based on the vehicle definition using the grid structure.

Reference is now made to FIG. 5, which shows an example process for determining whether a driver is present. The process starts at block 510 and proceeds to block 520 in which the coordinates of all possible driver's seats are determined. This could be based on the coordinates specified under the "drivers" tag, as for example defined in Table 6 above.

Once the coordinates of the drivers' seats are found, the identification of a seat itself could be made at block 522. Block 522 may choose the first coordinate in the list of coordinates for driver's seats if multiple coordinates exist, and find the seat for that coordinate.

The process then proceeds to block 530 in which a check is made to determine whether the seat found at block 522 is occupied. This may occur, for example, utilizing a seat occupancy sensor such as a pressure sensor within the seat itself. The seat occupancy sensor could be associated with the coordinate for the seat or as an attribute of the seat itself.

If, at block 530, it is determined that the seat is not occupied, the process proceeds to block 532 in which a check is made to determine whether coordinates for other driver's seats were returned at block 520.

If yes, the process proceeds back to block 522 in which another possible driver's seat coordinate is chosen and the seat for that coordinate location is found.

Conversely, at block 532, if no other driver's seats are found, the process proceeds to block 540 in which an indication is returned indicating that the driver's seat is not occupied. The process then proceeds to block 542 and ends.

Conversely, from block 530, if the occupancy sensor for the seat finds that the seat is occupied, then the process may proceed from block 530 to block 550 in which the process may return that the driver's seat is occupied and provide information as to which seat that is (in cases where there may be more than one driver seat). Instead of returning a Boolean, a Seat object or "null" may be returned, with "null" representing "false" or "no driver seat is occupied". The process may then proceed to block 542 and end.

The embodiment of FIG. 5 may be expressed in pseudocode as shown in Table 20 below.

TABLE 20

Pseudocode to determine if a driver is in the driver's seat

```
Bool isDriverPresent( ) {
    Vector drivers = getDrivers( )
    For each Coord driverCoord in drivers {
        Seat seat = getByCoord ("seats", driverCoord.getCoord( ))
        If (seat.isOccupied( )) {
            return true
        }
    return false
}
```

Thus, Table 20 and FIG. 4 provide an example in which the coordinates can be specified for which seat is a driver's seat and a systematic check can be made to determine whether such seat is occupied. This allows for cases where the vehicle is not a standard vehicle and therefore provides a flexible system.

Is the Front Passenger's Window Open?

From a vehicle abstraction layer perspective, the front passenger window may be on the left side of the vehicle or the right side of the vehicle, depending on the whether the vehicle is a right hand drive vehicle or a left hand drive vehicle.

In this regard, the grid coordinate system can be leveraged to find the correct window and determine whether such window is open.

Figure 6:
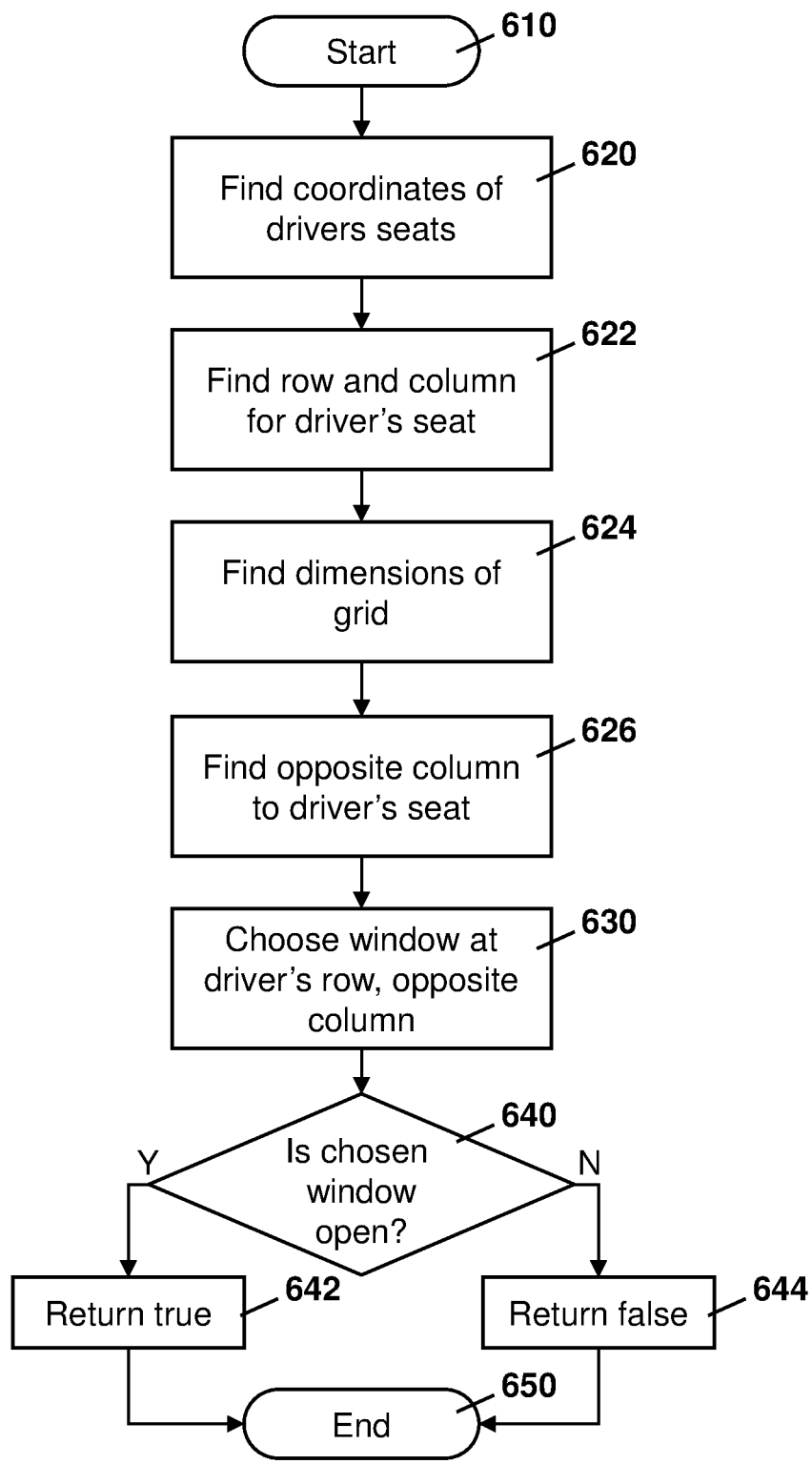
FIG. 6 is a process diagram for finding whether a passenger window is open based on the vehicle definition using the grid structure.

Reference is now made to FIG. 6, which shows an example process for determining whether a passenger window is open. The embodiment of FIG. 6 starts at block 610 and proceeds to block 620 in which the coordinates of the driver's seat can be found. This can be for example done by querying the configuration files for the vehicle and utilizing a configuration such as that shown with Table 5 or Table 6 above.

Based on the coordinates found at block 620, the process proceeds to block 622 and finds the row and column for a driver's seat. In the example of FIG. 6 an assumption is made that there is only a single driver's seat. However, the process of FIG. 6 could easily be expanded to include multiple driver seats. In this case, the passenger side window may be determined based on embodiment of FIG. 6 and finding the side opposite an active driver, for example.

From block 622 the process proceeds to block 624 in which the dimensions of the grid for the vehicle or the cabin are found. This is done based on the assumption that the driver and passenger front seats are on the edges of the grid and may utilize configuration files for the vehicle specified by, for example, the original equipment manufacturer.

Based on the dimensions of the grid and the location of the driver's seat, the passenger seat may be found. For example, in a left hand drive vehicle, the driver may be at position (1,1,1). In this case, the passenger may be at the maximum column width of the grid. Utilizing the embodiment from FIG. 2 and dimensions as for example specified in Table 4, the maximum column is 3 and therefore the passenger seat would be found at (1,3,1).

Conversely, in a right hand drive vehicle, the driver may be at position (1,3,1). Since the driver is at the maximum column value, in this case it may be assumed that the passenger seat is at the minimum column value, or at (1,1,1).

Based on the determination at block 626, the process proceeds to block 630 in which a window is chosen in the driver's row, and at the column that is opposite the driver.

At block 640, a check may be made on the chosen window to determine whether it is open. In some embodiments, a window sensor may indicate how much a window is open, from 0% indicating that the window is closed to 100% indicating that the window is fully open. In this case, determination at block 630 may find that the window is open if the percentage is anywhere over 0%. However, in other cases, the check may allow for slightly ajar windows and the check at block 640 may determine whether the window is open more than 10% for example. Other options are possible.

From block 640, if the window is open, the process proceeds to block 642 and returns true. Conversely, if it is determined that the window is closed, the process proceeds from block 640 to block 644 in which the process returns a false for the window being open.

From blocks 642 and 644, the process proceeds to block 650 and ends.

The embodiment of FIG. 6 may, for example, be expressed in pseudocode as shown in Table 21 below.

TABLE 21

Pseudocode to determine if the passenger window is open

```
Bool isPassengerWindowOpen( ) {
  Vector drivers = getDrivers( )
  int maxColumn = getDimensions( ).column( )
  //assume there is only one driver
  int row = drivers[0].row( )
  //find the column for the driver and use the opposite column for the
      passenger
  int col =drivers[0].column(0)
  //handle right-hand drive
  if (col == maxColumn) {
    col = 1
  } else {
    col= maxColumn
  }
  Window window = getByCoord("windows", Coord(row, col, 1))
  //window level is a percentage, where 0% is closed and 100% is opened
  return (window.level( ) > 0)
}
```

In Table 21, the column is determined to be either a "1" or the "maxColumn" based on the side that the driver is on.

The window is classified as a window object. However, in some cases the window may be a subset of another object such as an automobile.

The pseudocode and example of FIG. 6 provide for the ability to utilize coordinates to easily find the correct passenger side window.

Which HVAC Station is Providing Service to the Rear Left Seat?

In another example use case, a determination may be made of which HVAC station is providing service to a particular seat. This may, for example, utilize the "associations" tag provided for in Tables 13 to 18 above.

Figure 7:
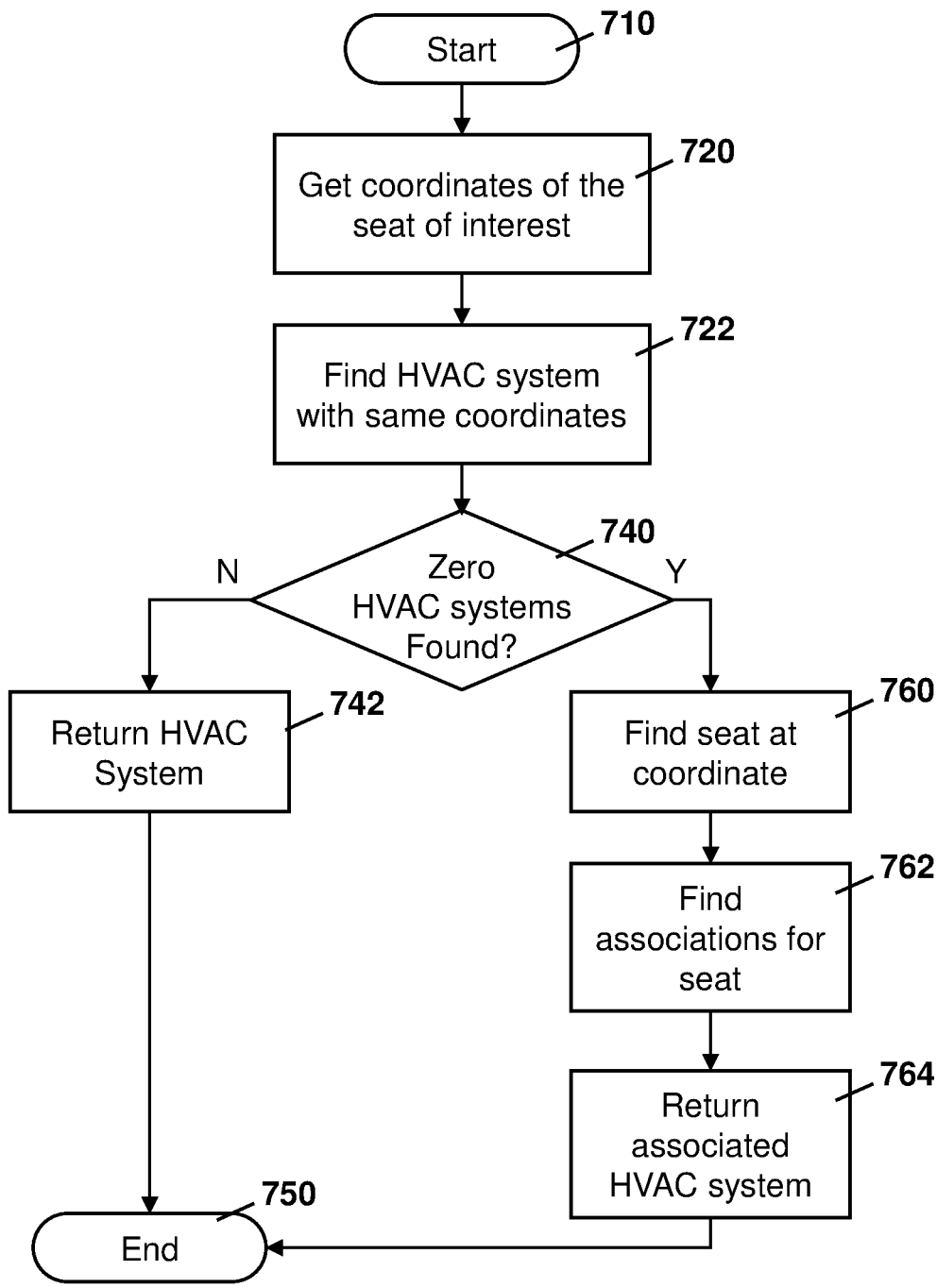
FIG. 7 is a process diagram for finding what HVAC system services a seat based on the vehicle definition using the grid structure.

Reference is now made to FIG. 7, which shows an example of the use of associations to find the HVAC system associated with a seat. In particular, the process starts at block 710 and proceeds to block 720 in which the coordinates of the seat of interest are found.

The system next proceeds to block 722 in which any HVAC system with the same coordinates is retrieved.

The process then proceeds to block 740 in which a check is made to determine whether any HVAC systems were found at block 722. In particular, referring to FIG. 2, if the coordinates for the seat of interest were (1,1,1), this would indicate the driver's seat and an HVAC system would be returned. Conversely, if the seat of interest had coordinates (2,1,1), this is the rear left seat and no HVAC system having the same coordinates would be found.

If the check at block 740 finds that one or more HVAC systems are retrieved at block 722, the process proceeds to block 742 in which pointers or data links to the one or more HVAC systems are returned. The process then proceeds to block 750 and ends.

Conversely, if at block 740 it is found that zero HVAC systems were retrieved, the process proceeds from block 740 to block 760 in which the seat object for the coordinates is found. For example, this could involve finding the identifier tag for the seat if identifier tags are used in associations.

The process then proceeds to block 762 in which associations for the seat object are retrieved from the list of associations stored for the vehicle. At this point, pointers or data links to the associated HVAC system could be returned, as shown at block 764.

The process then proceeds to block 750 and ends.

As can be seen in FIG. 7, a first association based on colocation can be checked. If no first association exists, a second association based on an explicit association table or list can be found. In each case, the coordinates of the seat of interest are utilized as the basis for the search.

Example pseudocode for the embodiment of FIG. 7 is provided below in Table 22.

TABLE 22

Pseudocode to determine HVAC station servicing the rear right seat

```
Coord getCoordByAssociation(Type type, Coord coord) {
  Seat seat = getByCoord(type, coord)
  String hvacID = getAssociationsByID(seat.id( ))
}
int main( ) {
  //Looking for rear row
  int maxRow = getDimiensions( ).row( )
  //this is the rear left seat
  Coord coord = Coord(maxrow, 1, 1)
  Hvac rearLeftSeatHavc = getbyCoord("havc-stations", coord)
  //if there was no direct association by coordinate, see if there is one by
      "associations"
  If (rearLeftSeatHvac == null_ptr) {
    Coord = getCoordByAssociation("seats", coord)
    rearLeftSeatHvac = getByCoord ("hvac-stations", coord)
  }
}
```

As will be appreciated by those skilled in the art, the examples of FIG. 7 and Table 22 are simplified versions of the code that would likely be used in practice. In particular, the example of FIG. 7 relies on a unilateral association and does not handle the possibility that an identifier can be associated with more than one component. Specifically, if an identifier is associated with more than one component, a check to find the component of interest may be needed. This may rely, in some cases, on the association between identifiers and component types.

However, the embodiment of FIG. 7 utilizes coordinates to find data objects of interest that are collocated as a first check. The embodiment of FIG. 7 then utilizes associations that are enumerated to find associated data objects of interest.

Finding which HVAC Services a Seat using Spans

Similar to associations, a span may be used to define the area that a data object services. In this regard, in some embodiments a span may be used to find which HVAC unit services a seat.

Figure 8:
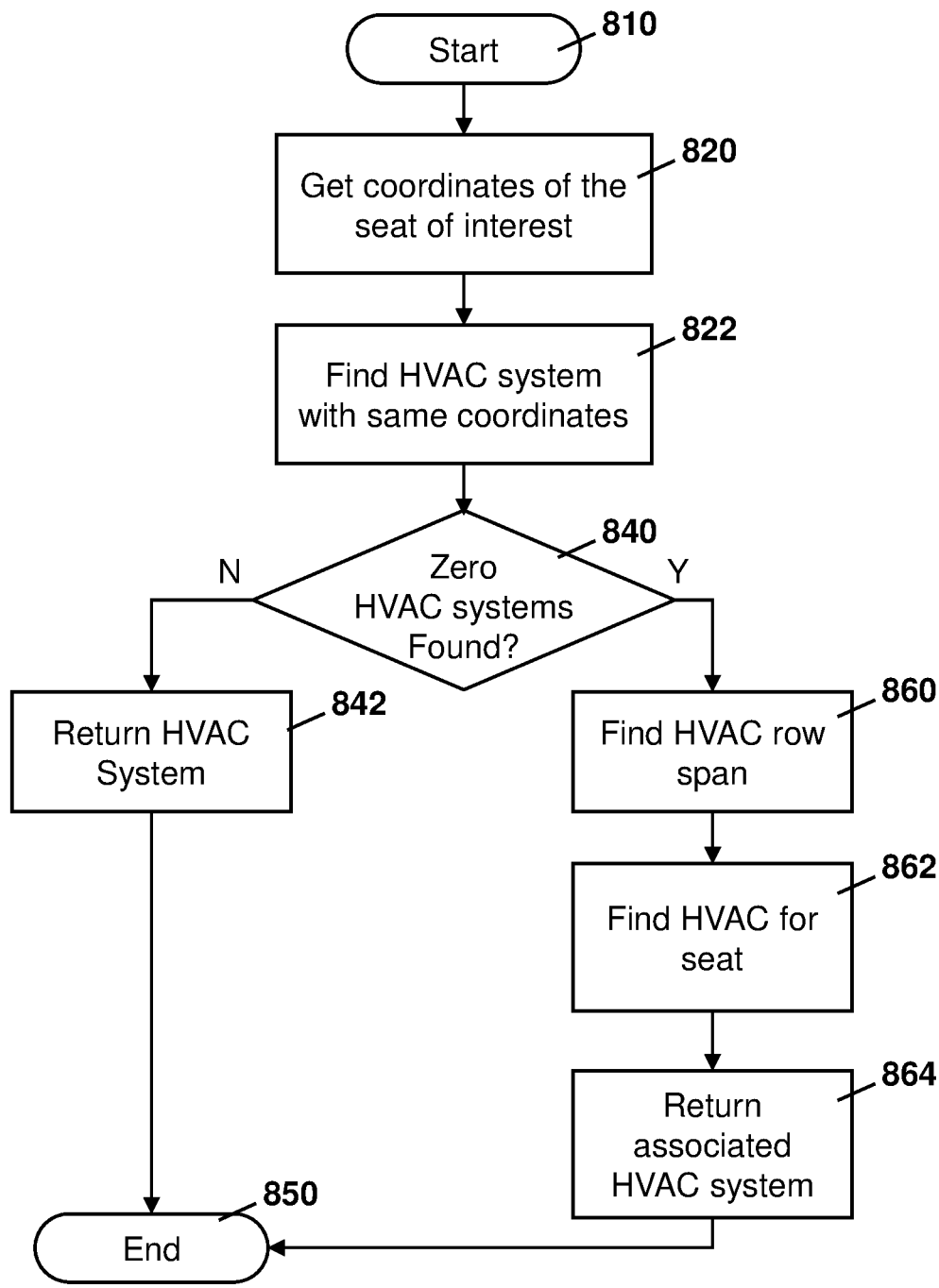
FIG. 8 is a process diagram for finding what HVAC system services a seat based on spans within the vehicle definition using the grid structure.

Reference is now made to FIG. 8. In the embodiment of FIG. 8, the process starts at block 810 and proceeds to block 820 in which the coordinates of the seat of interest are found.

The process then proceeds to block 822 in which any HVAC units with the same coordinates are retrieved. At block 840 a check is made to determine whether an HVAC system with the same coordinates exists.

If an HVAC system with the same coordinates exists, the process proceeds to block 842 in which a pointer or data reference to the HVAC system is returned. The process then proceeds to block 850 and ends.

Conversely, if at block 840 it is found that zero HVAC systems with the same coordinates exist, the process proceeds from block 840 to block 860 in which HVAC spans are found. The process then proceeds to block 862 in which an HVAC for the seat coordinates based on the spans is identified.

The process then proceeds to block 864 in which a pointer or data link to the HVAC system found at block 862 is returned.

From block 864, the process proceeds to block 850 and ends.

Pseudocode for the example of FIG. 8 is provided below with regard to Table 23.

TABLE 23

Pseudocode to determine HVAC station based on spans

```
int main( ) {
  //Looking for rear row
  int maxRow = getDimensions( ).row( )
  //this is the rear left seat
  Coord coord = Coord(maxrow, 1, 1)
  Hvac rearLeftSeatHavc = getbyCoord("havc-stations", coord)
  //if there was no direct association by coordinate, see if there is one by
"spans"
  If (rearLeftSeatHvac == null_ptr) {
    coord = getCoordByRowSpan("hvac-stations", coord)
    rearLeftSeatHvac = getByCoord ("hvac-stations", coord)
  }
}
```

Therefore, FIG. 8 and table 23 provide options for using spans to create the associations.

Locating a Second Data Object Associated with a First Data Object

The embodiments of FIGS. 5 to 8 can be generalized for the finding of the associations between data objects. In particular, reference is now made to FIG. 9.

Figure 9:
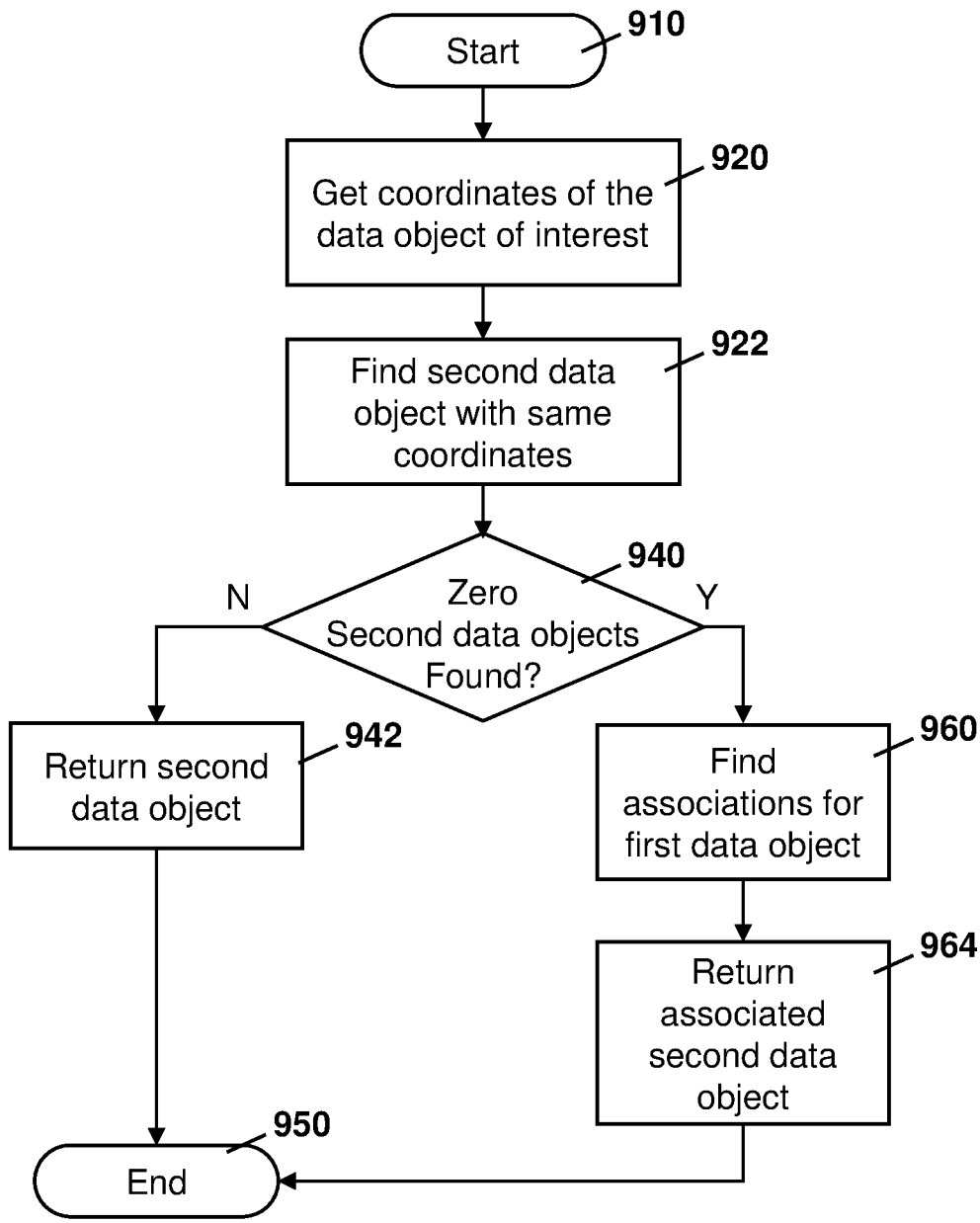
FIG. 9 is a process diagram for finding what data object services another data object or location based on the vehicle definition using the grid structure.

In the embodiment of FIG. 9 the process starts at block 910. Typically, this occurs when an abstraction layer or program needs to know what data objects are associated with a particular data object or a particular location. As indicated above, this may be "what HVAC system services this seat", but may include "what audio source services these speakers", among other options. Such question may be generalized as "what second data object services this first data object".

The process proceeds to block 920 in which the coordinates of the first data object are found. As will be appreciated by those in the art, if rather than a first data object, the question asked by the program or abstraction layer was "what second data object services this coordinate location" then block 920 may be optional as the coordinate is already known.

The process then proceeds to block 922 in which a check is made to determine whether a second data object is collocated with the first data object. In particular, the collocation may provide a first, implicit, association between the data objects.

The process then proceeds to block 940 in which a check is made to determine whether any second data objects were found. If one or more data objects are found then, based on the colocation, the second data object may be returned at block 942. The returning the second data object may involve a pointer, data reference, among other options.

The process proceeds from block 942 to block 950 and ends.

Conversely, if zero second data objects are found to be collocated with the first data object at block 940 (or zero second data objects are found at a particular coordinate location) the process proceeds to block 960 in which associations for the first data object or location may be found. Such finding at block 960 may use the explicit associations defined in the vehicle definition utilizing the grid structure of the present disclosure.

The process then proceeds block 964 in which the associated second data object may be returned. This may be done, utilizing a pointer, data reference, among other options.

From block 964 the process proceeds to block 950 and ends.

EXAMPLE VEHICLE SYSTEM

The present disclosure is described with regard to an automotive system with nodes. However, this is merely provided for illustration purposes and the methods and systems described herein could equally be used with any other systems.

Figure 10:
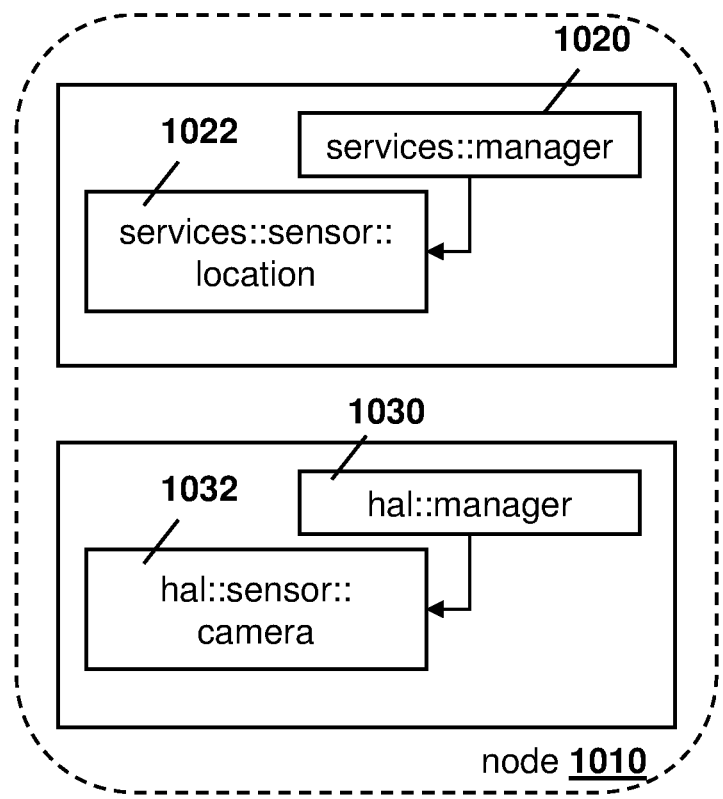
FIG. 10 is a block diagram showing an example vehicle computing node.

For example, reference is now made to FIG. 10 which shows a node 1010. A node, as used herein, may be one or a group of electronic control units, central processing units, or kernel controls, among other options, and can be considered as a single computing unit.

In the example of FIG. 10, node 1010 includes a services manager 1020 which may interact with drivers for sensors that the node is connected to. For example, the node 1010 may have access to a location sensor such as a Global Positioning System (GPS) chipset, as shown at block 1022.

In order to allow node 1010 to interact with modules on other nodes, and to provide functionality with a computing system, a Hardware Abstraction Layer (HAL) may be provided on node 1010, which comprises a HAL service 1030. Each HAL service 1030 is responsible for the integration of a sensor and may provide various functions, including: integration to the underlying sensor; normalization of the sensor data; and/or, if required, providing a barrier between the safety certified and non-certified software. Other functions for the HAL service are also possible.

In the example of FIG. 10, the HAL is provided for camera information, as shown with block 1032.

While the example of FIG. 10 shows a node 1010 with a single service and a single HAL, this is merely provided for illustration purposes. A node 1010 could have a single service without a HAL, a single HAL without a service, a plurality of services with no HAL, a plurality of HALs with no service, and/or a combination of services and HALs.

One example of a system that could use node 1010 would be an applications development environment for vehicles. Such applications development environment may develop applications for user experience including comfort, navigation, infotainment, among others, applications for safety, applications for fleet management; applications for performance monitoring; or other such applications for a vehicle environment. In particular, vehicles provide a plurality of sensors and different makes, models or brands may use different sensors with different data formats or values, creating fragmented sensor readings depending on such sensor. This fragmentation impedes the fostering of an application ecosystem that makes use of vehicle data. In addition, low level sensor data is often too granular to be readily useful to applications.

In this regard, the Hardware Abstraction Layer can be used to provide hardware independent sensor interfaces/abstractions which may encapsulate interaction with underlying sensor drivers. The use of the hardware abstraction in the various computing nodes creates a platform that is extensible, can provide barriers between modules to, for example, enforce safety certified systems being separate from other systems, among other options.

Applications do not interact directly with sensor hardware to access sensor data, instead they leverage the Hardware Abstraction Layer. This separation provides a clear distinction between the responsibilities of the HAL (sensor integration and normalizing sensor data) and other abstractions such as a Vehicle Abstraction Layer (VAL), used for managing access to vehicle data and providing value-added insights.

Specifically, insights may leverage sensor data from multiple HALs in order to provide vehicle abstraction and value-added insights. Vehicle insight services in the VAL may control access to a normalized form of vehicle data and provide value-added inferences. Examples of insight services may include a Location Service, which may provide coordinate location data in a consistent format as well as insights such as geo-fencing; a Seat Service, which may provide a myriad of seat information such as belt status, weight, position, and child lock status; a Camera Service which may provide the video stream for in-cabin camera and possibly functions such as conversions and/or clipping; a Battery Service which may provide insights and access to battery such as charge state/consumption/projected hours remaining/projected range; a Door Service which may provide an abstraction for vehicle doors and door status; among others.

Insight Services may leverage sensor data from multiple HALs in order to provide vehicle abstraction and value-add insights. Higher level insights on data enable application developers to create future automotive experiences. Insight is the term used to describe any value-added interpretation of basic sensor data. Insights can be as straight forward as data aggregation or correlation or as complex as artificial intelligence and machine learning. For example, for a temperature sensor, providing high and low watermarks for notification may be considered an "insight". For location services—geofencing is an insight, for cameras—occupant recognition may be considered an insight.

Nodes with services and HAL managers as described in FIG. 10 are therefore needed for such application development environment. Node 1010 will, in many systems, need to communicate with other nodes, such as other ECUs, CPUs, or computing systems, where such ECUs, CPUs, or computing systems may use a different operating system from that of node 1010.

Such system may use a grid system with the vehicle to find data objects and data object associations. In this regard, a vehicle abstraction layer can easily provide information regardless of the specific make and model of the vehicle for which information is sought.

EXAMPLE COMPUTING SYSTEM

The above network elements, nodes, computing devices and other computing platforms may be implemented using any computing device. One simplified diagram of a computing device is shown with regard to FIG. 11. The computing device of FIG. 11 could be any fixed or mobile computing device.

Figure 11:
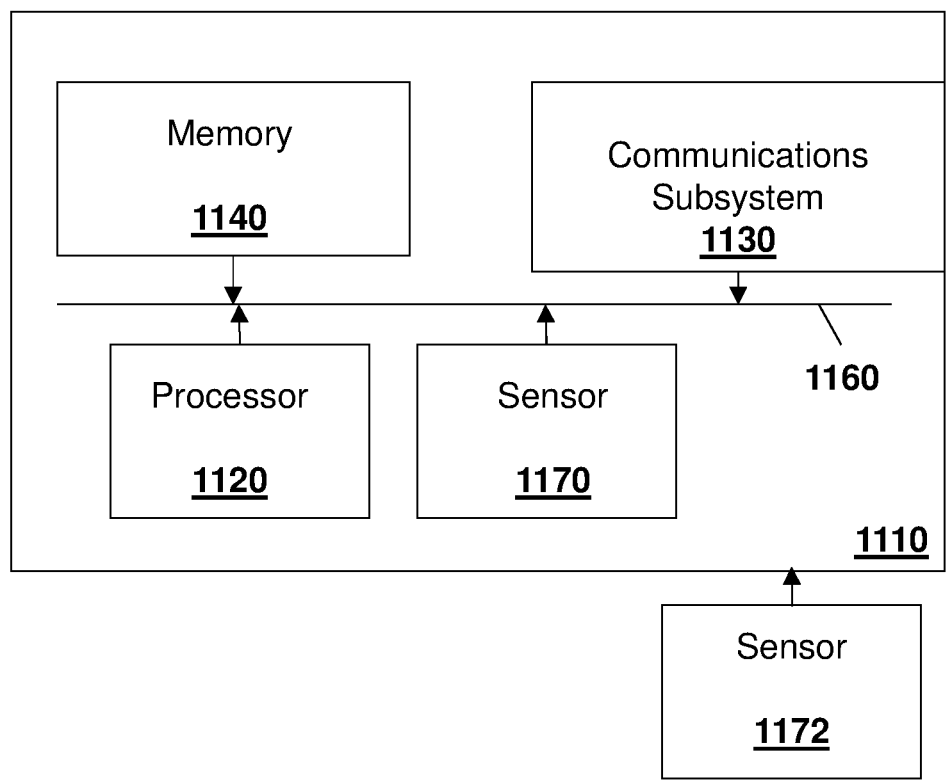
FIG. 11 is a block diagram of a simplified computing device capable of being used with the embodiments of the present disclosure.

In FIG. 11, device 1110 includes a processor 1120 and a communications subsystem 1130, where the processor 1120 and communications subsystem 1130 cooperate to perform the methods of the embodiments described above. Communications subsystem 1130 allows device 1110 to communicate with other devices or network elements and may vary based on the type of communication being performed. Further, communications subsystem 1130 may comprise a plurality of communications technologies, including any wired or wireless communications technology.

Processor 1120 is configured to execute programmable logic, which may be stored, along with data, on device 1110, and shown in the example of FIG. 11 as memory 1140. Memory 1140 can be any tangible, non-transitory computer readable storage medium which stores instruction code that, when executed by processor 1120 cause device 1110 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1140, device 1110 may access data or programmable logic from an external storage medium, for example through communications subsystem 1130.

In the example of FIG. 11, one or more internal sensors 1170 or external sensors 1172 may be associated with the computing device. However, this is optional and in some cases computing device 1110 will not be associated with sensors.

Communications between the various elements of device 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for finding an association between data objects in a structure, the method comprising:
   assigning, to each of a plurality of components of a vehicle, a respective data object, each respective data object having a location in a grid based on a position of a corresponding component in the vehicle, wherein the grid defines locations within the structure;
   selecting a coordinate location from the grid;
   finding whether a data object having a data object type is located at the coordinate location;
   when the data object is located at the coordinate location, associating the data object with other data objects at the coordinate location;
   when no data object is located at the coordinate location, determining through an explicit association that a second data object at a second location services the coordinate location and associating the second data object with the coordinate location;
   obtaining an associated data object using an association of one of the data object and the second data object;
   querying the associated data object; and
   receiving a response comprising a status of the associated data object based on a sensor reading.

2. The method of claim 1, wherein the selecting comprises:
   choosing a data object of interest; and
   finding the coordinate location of the data object of interest.

3. The method of claim 1, wherein the grid structure comprises a three dimensional grid, and wherein the coordinate location is a triplet.

4. The method of claim 1, wherein the explicit association comprises an association between two data objects.

5. The method of claim 4, wherein the explicit association is expressed with a third data object being provided a service being associated with the second data object providing the service.

6. The method of claim 4, wherein the explicit association is expressed with a data object being providing a service being associated to at least one data object being provided the service.

7. The method of claim 1, wherein the explicit association is for the second data object and at least one coordinate location to which the second data object provides services.

8. The method of claim 1, wherein the explicit association is based on a span of grid locations serviced by the second data object.

9. The method of claim 1, wherein the grid defines a grid size for different levels of granularity within the structure.

10. A computing device configured for finding an association between data objects in a structure, the computing device comprising:
    a processor; and
    a communications subsystem, wherein the computing device is configured to:
    assign, to each of a plurality of components of a vehicle, a respective data object, each respective data object having a location in a grid based on a position of a corresponding component in the vehicle, wherein the grid defines locations within the structure;
    select a coordinate location from the grid;
    find whether a data object having a data object type is located at the coordinate location;

when the data object is located at the coordinate location, associate the data object with other data objects at the coordinate location;

when no data object is located at the coordinate location, determine through an explicit association that a second data object at a second location services the coordinate location and associate the second data object with the coordinate location;

obtain an associated data object using an association of one of the data object and the second data object;

query the associated data object; and receive a response comprising a status of the associated data object based on a sensor reading.

11. The computing device of claim 10, wherein the computing device is configured to select by:

choosing a data object of interest; and finding the coordinate location of the data object of interest.

12. The computing device of claim 10, wherein the grid structure comprises a three dimensional grid, and wherein the coordinate location is a triplet.

13. The computing device of claim 10, wherein the explicit association comprises an association between two data objects.

14. The computing device of claim 13, wherein the explicit association is expressed with a third data object being provided a service being associated with the second data object providing the service.

15. The computing device of claim 13, wherein the explicit association is expressed with a data object being providing a service being associated to at least one data object being provided the service.

16. The computing device of claim 10, wherein the explicit association is for the second data object and at least one coordinate location to which the second data object provides services.

17. The computing device of claim 10, wherein the explicit association is based on a span of grid locations serviced by the second data object.

18. The computing device of claim 10, wherein the grid defines a grid size for different levels of granularity within the structure.

19. A non-transitory computer readable medium for storing instruction code, which, when executed by a processor of a computing device configured for finding an association between data objects in a structure causes the computing device to:

assign, to each of a plurality of components of a vehicle, a respective data object, each respective data object having a location in a grid based on a position of a corresponding component in the vehicle, wherein the grid defines locations within the structure;

select a coordinate location from the grid;

find whether a data object having a data object type is located at the coordinate location;

when the data object is located at the coordinate location, associate the data object with other data objects at the coordinate location;

when no data object is located at the coordinate location, determine through an explicit association that a second data object at a second location services the coordinate location and associate the second data object with the coordinate location;

obtain an associated data object using an association of one of the data object and the second data object;

query the associated data object; and receive a response comprising a status of the associated data object based on a sensor reading.

\* \* \* \* \*